June 19, 1951

R. F. WILD 2,557,329

TELAUTOGRAPH SYSTEM

Filed Oct. 6, 1945

*INVENTOR.*
RUDOLF F. WILD

BY Arthur H. Swanson

ATTORNEY.

June 19, 1951   R. F. WILD   2,557,329
TELAUTOGRAPH SYSTEM
Filed Oct. 6, 1945   3 Sheets-Sheet 2

*INVENTOR.*
RUDOLF F. WILD
BY
Arthur H. Swanson
ATTORNEY.

June 19, 1951 R. F. WILD 2,557,329
TELAUTOGRAPH SYSTEM
Filed Oct. 6, 1945 3 Sheets-Sheet 3

INVENTOR.
RUDOLF F. WILD
BY Arthur H. Swanson
ATTORNEY.

Patented June 19, 1951

2,557,329

UNITED STATES PATENT OFFICE 2,557,329

TELAUTOGRAPH SYSTEM

Rudolf F. Wild, Philadelphia, Pa., assignor, by mesne assignments, to Minneapolis-Honeywell Regulator Company, Minneapolis, Minn., a corporation of Delaware Application October 6, 1945, Serial No. 620,830

1 Claim. (Cl. 178—19)

The present invention relates to improvements in telautograph systems.

A general object of the invention is to provide an improved method of and apparatus for transmitting plotted data or written information from a transmitting station to a remotely located receiving station.

Another object of the invention is to provide such a telautograph system which is rapid in operation and accurate in the reproduction of the transmitted material.

A further object of the invention is to provide a telautograph system in which intelligence indicative of the position of a plotting stylus relatively to a pair of coordinates may be transmitted to a remotely located receiver by way of a single communicating channel.

Another object of the invention is to provide a telautograph system in which intelligence indicative of the position of a plotting stylus relative to a pair of coordinates, and intelligence indicative of whether the plotting stylus is in a "writing" or "non-writing" position, may all be transmitted to a remotely located receiver by way of a single communicating channel.

A more specific object of the invention is to provide a telautograph system in which the communicating channel between the transmitter and receiver may comprise a single carrier wave in a wireless system. It is a specific object of the invention also to provide such a telautograph system in which three types of intelligence indicative of the location of a plotting stylus relatively to a pair of coordinates and indicative of the "writing" or "non-writing" adjustment of the plotting stylus may be transmitted to a remotely located receiver by means of a single carrier wave in a wireless system.

In accordance with the present invention the position of a point to be transmitted to a remotely located receiver is considered in terms of its location with respect to selected coordinates. For example, when rectangular coordinates are utilized the position of a point to be transmitted is considered in terms of distance between said point and each of two mutually perpendicular lines or coordinate axes. If the distance from the point to each of the lines is measured, the position of the point may be readily determined. Accordingly, if the magnitude of the deviation in position of the point from each of the coordinate axes is transmitted to the remotely located station, the two deviations can be combined at that remote station to there cause an element to assume a corresponding position relatively to similar coordinate axes located at the station.

In a telautograph system of this type intelligence indicative of the displacement of the point to be transmitted from each of the coordinate axes must be transmitted simultaneously. Furthermore, if the system is employed for writing or for certain types of plotting there must also be transmitted a third type of intelligence which is indicative of adjustment of the writing or plotting stylus into its "writing" or "non-writing" position. In the telegraph and facsimile arts these adjustments of the plotting stylus are termed respectively the "marking" and "spacing" adjustments of the stylus.

Hence, in a system of the type under consideration, it is necessary to transmit three types of intelligence; two for determination of the position of the remotely located recording stylus and the third for activation of the recording stylus into its "writing" or "non-writing" position, accordingly as the transmitter plotting stylus is moved into its "writing" or "non-writing" position.

It is a feature of the present invention that all three types of intelligence may be simultaneously transmitted from the transmitter to the remotely located receiver by way of a single carrier wave. A further feature of the invention is that this single carrier requires only a relatively narrow frequency channel.

Specifically, in a preferred embodiment of the invention the intelligence indicative of the horizontal and vertical positions of the writing stylus at the transmitter is in the form of two radio frequency signals in the lower end of the radio frequency band such as, for example, in the region of 500 kilocycles per second. These two frequencies may be varied between 450 and 550 kilocycles per second, depending upon the adjustment of the writing stylus from one extreme position to another extreme position. These two high frequency signals are keyed or interrupted in opposite phase at a low rate of speed of, for example, 60 cycles per second so that only one radio frequency signal is transmitted at any time during alternate half cycles of the 60 cycle keying signal. These signals are then combined to produce a radio frequency signal of substantially constant amplitude, the frequency of which during alternate half cycles of the 60 cycle keying signal is indicative of the horizontal and vertical positions, respectively, of the writing stylus.

In order to narrow the radio channel required for transmission, means are provided to divide the radio frequency in a suitable ratio, for example, a ratio of 5 to 1.

When the transmitter stylus is actuated into its writing or marking position, the combined radio frequency signal is amplitude modulated by a low frequency of 200 cycles per second, for example, in order to indicate "marking" as is conventional in the telegraph and facsimile arts. During "spacing" intervals, that is when the transmitter stylus is not adjusted into its writing position, no amplitude modulation takes place. The percentage of amplitude modulation of the radio frequency signal by the 200 cycle per second signal is chosen to be relatively low.

The amplitude-modulated radio frequency signal of variable frequency is then modulated on a 5 megacycle carrier and the carrier is suppressed. After suppression of one of the side-bands a radio frequency signal having a frequency between 5.1 megacycles per second minus 10 kilocycles per second and 5.1 megacycles per second plus 10 kilocycles per second remains as a new carrier which during actual writing or marking has two side-bands spaced 200 cycles from the new carrier. Consequently, the total maximum channel width, disregarding side-bands which may be caused by extremely rapid variations, is 20.4 kilocycles per second. At the receiver the received carrier frequency is heterodyned with a locally generated 5 megacycles per second signal to produce an intermediate frequency signal varying about 100 kilocycles per second. For positioning of the recording stylus or the like, the amplitude modulation of the intermediate frequency is removed and this signal is then applied to keyed amplifiers actuating the motive structure for the recording stylus. The intermediate frequency signal is also applied to a first detector in the output circuit of which a 200 cycle per second signal appears during actual writing or marking of the transmitter stylus. This 200 cycle per second signal is again detected to produce a direct current capable of actuating the recording stylus.

The various features of novelty which characterize this invention are pointed out with particularity in the claim annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
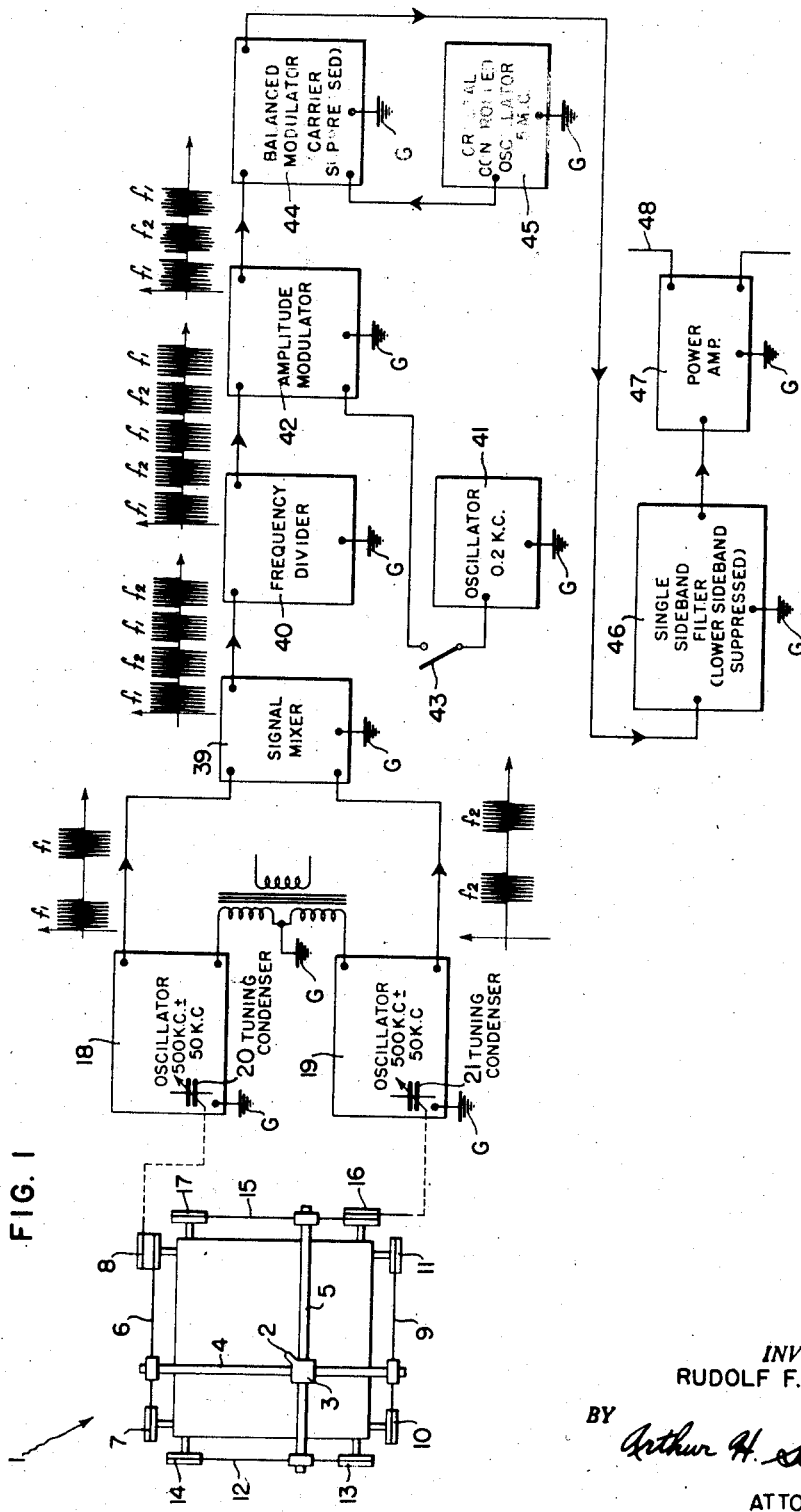
Fig. 1 illustrates schematically the transmitter mechanism of a preferred embodiment of the invention.

Referring now to Fig. 1 of the drawings, there is shown a transmitter comprising writing or plotting apparatus indicated generally by the reference character 1 including a writing or plotting stylus 2. The stylus 2 is mounted on a carriage 3 which is supported for movement in the horizontal and vertical coordinates by rods 4 and 5, respectively. The rods 4 and 5 are provided with rollers, not shown, which ride on individually associated tracks, also not shown in order to avoid complication of the drawing. A cable 6 supported by pulleys 7 and 8 is connected to one end of the rod 4 while a cable 9 supported by pulleys 10 and 11 is connected to the other end of the rod 4. Similarly, a cable 12 supported by pulleys 13 and 14 is connected to one end of the rod 5 while a cable 15 supported by pulleys 16 and 17, is connected to the other end of the rod 5. Accordingly, when the stylus 2 is moved along a horizontal coordinate, the rod 4 moves the cables 6 and 9 to effect rotation of the pulley 8. Similarly, when the stylus 2 is moved in the vertical coordinate, the pulley 16 is correspondingly rotated.

There are also provided a first and a second radio frequency oscillator designated respectively by the reference numerals 18 and 19, each of which is provided with an associated tuning condenser 20 and 21 which is mechanically coupled to the writing apparatus in such manner that the first oscillator 18 is tuned in accordance with the movements of the writing stylus 2 along the horizontal coordinate while the second oscillator 19 is tuned in accordance with the movements of the writing stylus 2 along the vertical coordinate. To these ends, the shaft of the pulley 8 is mechanically coupled in any suitable manner to the rotatable element of the variable condenser 20 and the shaft of the pulley 16 is mechanically coupled to the rotatable element of the variable condenser 21.

If desired, the mechanism for tuning the oscillators 18 and 19 in accordance with the movements of the transmitter stylus 2 in two coordinates may be of the type disclosed in the application of George W. Barnes, John F. Goetz, and Walter P. Wills, Serial No. 620,827, filed concurrently herewith, and which issued on May 23, 1950, as U. S. Patent No. 2,508,592.

Figure 2:
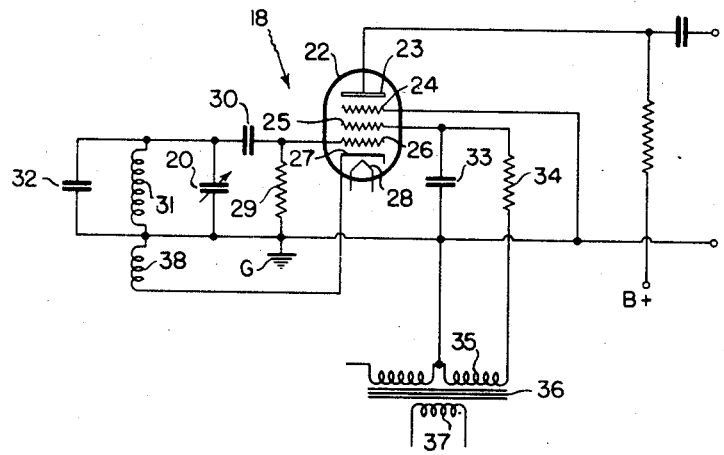
Fig. 2 is a wiring diagram showing details of the variable frequency oscillators of Fig. 1.

In the preferred embodiment of the invention both of the oscillators 18 and 19 are arranged to be tuned over a range varying from approximately 450–550 kilocycles per second, corresponding respectively to the extreme horizontal and vertical positions of the writing stylus 2. One form which each of the oscillators 18 and 19 may take is illustrated schematically in Fig. 2. The oscillators 18 and 19 may be identical in construction and therefore only the details of the oscillator 18 are shown in Fig. 2.

As shown, the oscillator 18 is an electron coupled oscillator and includes a pentode tube 22 which may be of the commercially available type 6SJ7. The tube 22 includes an anode 23, a suppressor grid 24, a screen grid 25, a control grid 26, a cathode 27, and a heater filament 28. The heater filament 28 is connected to and receives energizing current from a suitable source of alternating current, not shown. Control grid 26 is connected through a resistance 29 to ground G and is also connected through a condenser 30 to one terminal of a parallel circuit including the detuning means or variable condenser 20 in one branch, an inductance coil 31 in another branch, and a condenser 32 in a third branch. The other terminal of that parallel circuit is connected to ground G. Screen grid 25 is connected through a condenser 33 to ground G and is also connected through a resistor 34 to one end terminal of the secondary winding 35 of a transformer 36 having a primary winding 37. The transformer primary winding 37 is connected to and receives energizing current at line voltage from a low frequency source of alternating current such, for example, as a commercial 60 cycle per second source of alternating current. The transformer secondary winding 35 is provided with a center tap which is connected to ground G. The other terminal of the secondary winding 35 is connected through a resistor corresponding to the resistor 34 to the screen grid of a pentode tube corresponding to the tube 22 in the oscillator 19.

The oscillating circuit of the oscillator 18 includes the control grid circuit of which the parallel circuit including the detuning means 20 forms a part and also includes the screen grid circuit which may be traced from the right end terminal of the transformer secondary winding 35 through resistor 34, screen grid 25, cathode 27, and an inductance coil 38 to ground G. These circuits are inductively coupled by the inductance coils 31 and 38 and provide for high frequency oscillation about a center frequency which, as previously noted, may be 500 kilocycles per second.

Since alternating voltage is applied to the screen grid 25 from the transformer secondary winding 35, high frequency oscillation is produced by the oscillator 18 only during alternate half cycles of the 60 cycle per second supply line voltage, namely those half cycles during which the screen grid is positive. For convenience of explanation, these alternate half cycles will be referred to hereinafter as the operative half cycles.

The screen grid 25 and the transformer secondary winding 35 are so utilized that the high frequency oscillation assumes its maximum amplitude near the beginning of each operative half cycle of the low frequency alternating voltage supply and continues at its maximum amplitude until near the end of that half cycle. The resistor 34 is included in the screen grid circuit to assist in the attainment of such operation and acts as a limiter to prevent the screen grid voltage from increasing beyond a predetermined value. In this manner the screen grid voltage is made to approximate a square wave during the operative half cycles of the 60 cycle per second alternating voltage. Accordingly, the high frequency oscillations produced by the oscillator 18 are maintained at an approximately constant amplitude during the operative half cycles of the 60 cycle per second supply voltage and are zero during the other half cycles of the alternating supply voltage.

Inasmuch as the screen grid of the pentode tube contained within the oscillator 19 is connected to the left end terminal of the transformer secondary winding 35, the alternating voltage impressed on that screen grid will be displaced 180° with respect to the alternating voltage impressed on the screen grid 25 of tube 22. Consequently, the high frequency oscillations generated by the oscillator 19 will be maintained at an approximately constant amplitude during the half cycles in which the oscillator 18 is not effective to produce high frequency oscillations. In other words, during one half cycle of the 60 cycle per second supply voltage the oscillator 18 is operative to produce a high frequency oscillation having an approximately constant amplitude, and during the alternate half cycles the oscillator 19 is operative to produce a high frequency oscillation having an approximately constant amplitude. Thus, the oscillators 18 and 19 are keyed out of phase with respect to each other, the keying signal being derived from the 60 cycle per second voltage supply source. Consequently, as indicated in Fig. 1 of the drawings, signals emanate from the first and second oscillators only during alternate half cycles of the 60 cycle per second keying signal and in such manner that signals emanate only from one oscillator at any time.

For the purpose of combining the two keyed radio frequency signals, there is provided a signal mixer indicated by the reference numeral 39 which may consist of a single amplifier tube, to the control grid of which both signals are applied. As indicated in the drawings, the output signal of signal mixer 39 then consists of a radio frequency signal of substantially constant amplitude, the frequency of which changes during alternate intervals of $\frac{1}{120}$ of a second if the writing stylus does not happen to be in the position in which both oscillators are tuned to the same frequency.

For the purpose of narrowing the required radio transmission channel, there is provided a frequency divider 40 having a dividing ratio of, for example, 5 to 1. This divider may comprise a conventional multi-vibrator frequency dividing circuit or any other frequency divider arrangement of known construction. For example, the frequency divider 40 may be of the type which relies in its operation upon the temporary blocking of amplifier tubes during the charging or discharging interval of a condenser in an RC network. After division the frequency of the radio frequency signal extends over a range from 90 kilocycles per second to 110 kilocycles per second as the writing element 2 is adjusted from one extreme position to the other.

In order to provide signal intelligence indicative of actual writing or marking, there is provided an oscillator indicated by the reference numeral 41 which is operative to produce an oscillation output current varying at a substantially constant frequency of 200 cycles per second. The output circuit of the oscillator 41 is connected to the input circuit of an amplitude modulator indicated at 42 by means of a single pole-single throw switch 43 which is arranged to be actuated into its closed position when the writing stylus 2 is moved down into engagement with the transmitter plotting or writing board.

The radio frequency signal output from the frequency divider 40 is also applied to the input circuit of the amplitude modulator 42 and its amplitude is modulated during marking intervals. Consequently, the output signal of the amplitude modulator 42 is of the same character as its input signal during intervals of "non-writing" or spacing, while it is amplitude modulated by the 200 cycle signal during marking intervals. The percentage modulation is held low so that the modulation envelope later may be readily removed by amplitude limiting or clipping. The amplitude-modulated signal, therefore, comprises a radio frequency signal of substantially constant amplitude during spacing intervals, modulated by the 200 cycle per second signal during marking intervals, and having a frequency in the range from 90 to 110 kilocycles per second which may change during alternate intervals of $\frac{1}{120}$ of a second.

A balanced modulator indicated at 44 is provided for modulating the output signal of the amplitude modulator 42 on a 5 megacycle signal derived from a crystal controlled oscillator indicated by the reference numeral 45. The balanced modulator 44 may be of known design and its output signal contains the two side-bands only, namely 5 megacycles plus (100 kilocycles ± X kilocycles) and 5 megacycles minus (100 kilocycles ± Y kilocycles) during spacing intervals where X and Y represent frequencies varying between zero and 10 kilocycles per second depending upon the horizontal and vertical positions, respectively, of the writing stylus 2. Each side-band has two side-band frequencies 200 kilocycles apart during marking intervals. Hence, for a particular horizontal position of the writing stylus the balanced modulator output signals may be as follows:

(a) Spacing = 5 megacycles+95 kilocycles and
    5 megacycles−95 kilocycles;
(b) Marking = 5 megacycles+95 kilocycles
    5 megacycles+95 kilocycles+0.2 kilocycle
    5 megacycles+95 kilocycles−0.2 kilocycle
    5 megacycles−95 kilocycles
    5 megacycles−95 kilocycles+0.2 kilocycle
    and
    5 megacycles−95 kilocycles−0.2 kilocycle The balanced modulator output signals for the radio frequency signal indicative of the vertical position of the writing stylus 2 vary in a manner corresponding to that in which they vary for the horizontal position of the writing stylus.

Since one of the side-bands produced by the balanced modulator 44 contains all the intelligence necessary for positioning a remote recording stylus, a single side-band filter indicated at 46 is provided for the purpose of suppressing the lower side-band. The side-band filter 46 is a transmission line filter and may be of known construction. If desired, the upper side-band may be suppressed and the lower one transmitted. The output signal of the single side-band filter 46 is applied to a power amplifier 47 and the amplified quantity is impressed on the transmitter antenna indicated at 48. During spacing intervals only a single frequency, which changes its frequency during successive intervals of 1/20 of a second, is transmitted. During marking intervals these signals are also accompanied by two side-bands each spaced 200 cycles from the selected side-band frequency which it is noted assumes the character of a carrier of an amplitude-modulated carrier signal.

Figure 3:
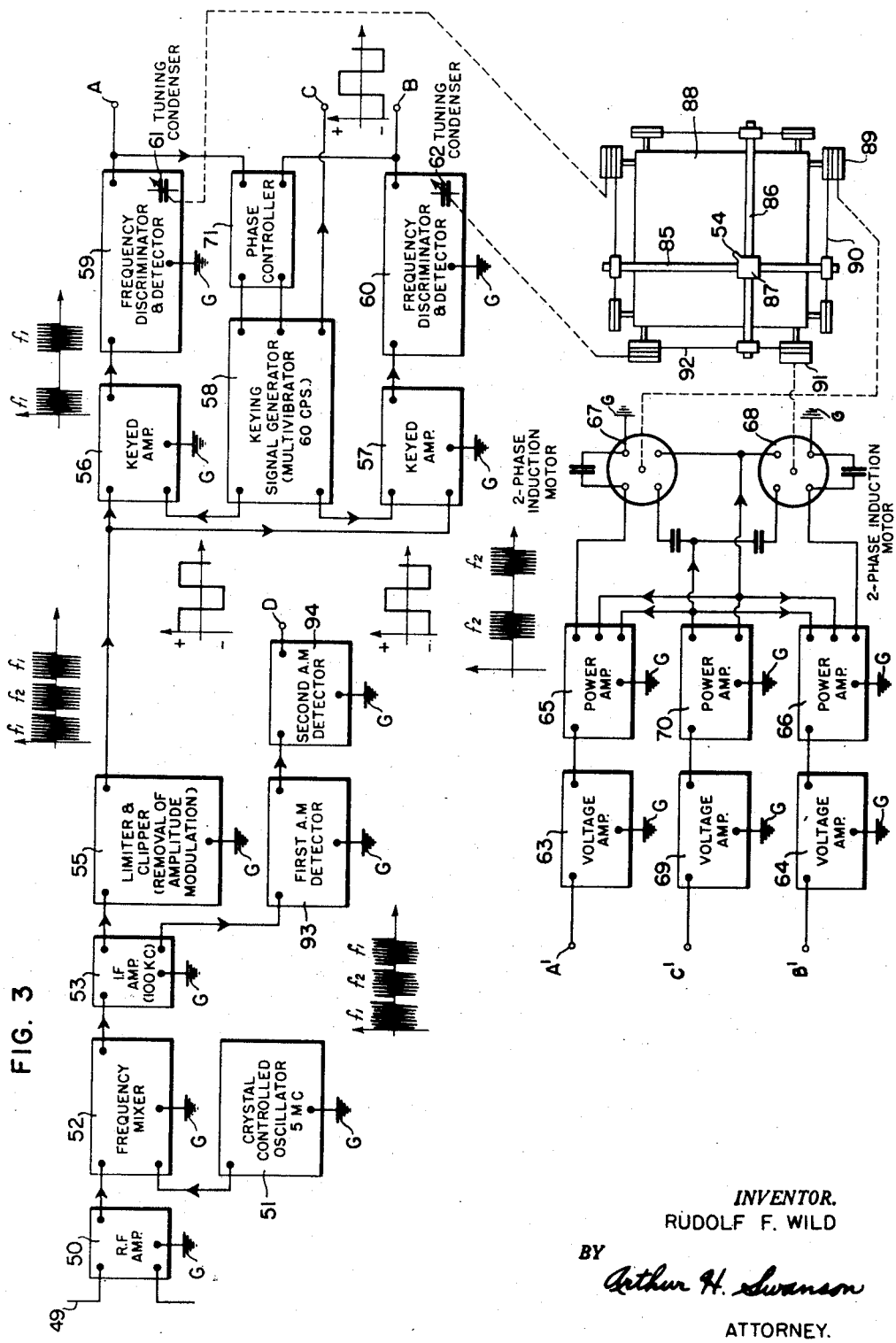
Fig. 3 illustrates schematically a preferred form of a receiver element which may be employed in conjunction with the transmitter of Fig. 1.

Referring now to Fig. 3 of the drawing, there is shown a receiver including a receiver antenna indicated at 49 and a radio frequency amplifier indicated at 50. A crystal controlled oscillator 51 and a frequency mixer 52 are provided in which the received and amplified radio frequency signals are heterodyned with the locally generated oscillating signals produced by oscillator 51 to produce an intermediate frequency signal. The oscillator 51 is arranged to produce an oscillating signal having a frequency of 5 megacycles per second. An intermediate frequency amplifier indicated at 53 and which is tuned to an intermediate frequency of 100 kilocycles and which has a band-width slightly greater than 20 kilocycles, is also provided. Inasmuch as the single side-band received at the receiver incorporates all of the information necessary for reproduction of the transmitted intelligence, it is not necessary to reinsert the carrier or the other side-band as in conventional single side-band transmission systems.

In order to apply intermediate frequency signals of substantially constant amplitude to the apparatus for positioning the recording stylus indicated at 54, there is provided a limiter and clipper 55 for removing the amplitude modulation envelope from the intermediate frequency signals. The limited and clipped intermediate frequency signals are then applied to two keyed amplifiers 56 and 57 which are keyed out of phase at the same rate as that at which the oscillators 18 and 19 of Fig. 1 are keyed, namely at a rate of 60 cycles per second. The 60 cycle keying signal is derived from a keying signal generator indicated at 58 and which may be a conventional multivibrator.

It is noted that the 60 cycle keying signal for the amplifiers 56 and 57 may be derived from a 60 cycle per second commercial source of alternating current which may be available at the receiver location. In case of long distance transmission, however, there is no assurance that the commercially available power line voltage at the receiver will be of the same frequency and phase as the frequency and phase of the power line voltage at the transmitter. Therefore, it is preferred to derive the keying signals for the amplifiers 56 and 57 from a separate keying signal generator 58 and to synchronize the frequency and phase of the output voltage of this generator with the frequency and phase of the 60 cycle per second alternating voltage provided at the transmitter. In accordance with the present invention, such synchronization is accomplished by means of utilization of the received signals. The manner in which such synchronization is accomplished will become apparent as the description proceeds.

For positioning of the recording stylus 54 there are provided two frequency discriminators and detectors, each connected to the output circuit of one of the keyed amplifiers 56 and 57. The frequency discriminator and detector connected to the output circuit of the keyed amplifier 56 has been indicated by the reference numeral 59 while the frequency discriminator and detector connected to the output circuit of the keyed amplifier 57 has been indicated by the reference numeral 60.

The details of balanced frequency discriminators and detectors 59 and 60 constitute no part of the present invention. Their manner of operation and arrangement is completely disclosed in my prior application, Serial No. 537,505, filed May 26, 1944, now Patent No. 2,532,872 of December 5, 1950, and therefore, need be only briefly referred to herein.

It is believed sufficient to note that when the frequency of the signals applied to each of the balanced frequency discriminators and detectors 59 and 60 is the value to which the frequency discriminator and detector is tuned, no output voltage is obtained. If the frequency of the applied signal is a value other than that to which the frequency discriminators and detectors are tuned, however, a direct current voltage output is obtained. The polarity of this output voltage depends upon whether the frequency of the applied signal is above or below the value to which the frequency discriminator and detector is tuned. The magnitude of the voltage depends upon the extent of departure of the frequency of the applied signal from the value to which the frequency discriminator and detector is tuned.

Recalling now that the signal applied to each of the frequency discriminators and detectors 59 and 60 is an intermittent radio frequency wave by virtue of the fact that the amplifiers 56 and 57 are keyed at the rate of 60 times per second, it will be seen that the voltage derived in the output circuits of the frequency discriminators and detectors when the frequency of the applied signal and the frequency to which the frequency discriminator and detector is tuned do not correspond, will be an intermittent or pulsating direct current voltage the polarity and magnitude of which are as above stated. Furthermore, since the applied signal is periodically interrupted at the frequency of 60 times per second, the pulsations of direct current voltage produced in the output circuits of the frequency discriminators and detectors 59 and 60 will have a frequency of 60 cycles per second.

The output voltage derived from each of the frequency discriminators and detectors 59 and 60 may be considered as comprising two components, namely (1) a steady D. C. component and (2) an A. C. component. The A. C. component is of one phase when the frequency of the applied signal is higher than the value to which the frequency discriminator and detector is tuned and is of the opposite phase when the applied frequency is lower than the frequency to which the frequency discriminator and detector is tuned.

In order to adjust the frequency to which the frequency discriminators and detectors are tuned, variable condensers 61 and 62 are provided in association, respectively, with the frequency discriminators and detectors 59 and 60.

The amplifiers 56 and 57 are keyed in order to cause the amplifier and frequency discriminator and detector for one coordinate of movement of the recording stylus to respond only to its corresponding oscillator at the transmitter. For example, the phase of the keying signal applied to key the amplifier 56 must be such that the latter is operative only during intervals in which the frequency $f_1$ is received and must be inoperative during intervals in which the frequency $f_2$ is received, where $f_1$ varies in accordance with the horizontal adjustments of the transmitter stylus 2 and the frequency $f_2$ varies in accordance with vertical adjustments of the transmitter stylus 2. Similarly, the phase of the keying signal applied to key amplifier 57 must be such that it is operative only during intervals in which the frequency $f_2$ is received and must be inoperative during intervals in which the frequency $f_1$ is received. If such keying provision were not made at the receiver, the amplifier 56 and frequency discriminator and detector 59 would respond not only to signals produced by the transmitter oscillator 18 but also to signals produced by the transmitter oscillator 19. Also, the amplifier 57 and frequency discriminator and detector 60 would respond not only to signals produced by the oscillator 19 but would respond also to signals produced by the oscillator 18. Obviously, this would make correct positioning of the stylus 54 in correspondence with the positioning of the transmitter stylus 2 impossible of accomplishment.

The output signals of the frequency discriminators and detectors 59 and 60 are applied to the input circuits of voltage amplifiers 63 and 64, respectively. The amplified signals derived from the voltage amplifiers 63 and 64 are applied to the input circuits of power amplifiers 65 and 66, respectively, and accordingly, to one phase winding of a pair of two-phase induction motors 67 and 68, respectively. Inasmuch as the voltages applied to these phase windings of each of the two-phase induction motors 67 and 68 must be in predetermined phase relation to the voltage applied to their other phase windings, it is necessary also to impress a voltage on said other phase windings. For this purpose one of the keying signals generated by the keying signal generator 58 is amplified by means of a voltage amplifier 69 and a power amplifier 70 and the amplified quantity derived from the latter is supplied to said other phase windings of each of the motors 67 and 68, as shown.

The means by which the keying signals for the amplifiers 56 and 57 are derived from the keying signal generator 58 and are synchronized with the frequency and phase of the keying signal voltage provided at the transmitter will now be described. In effecting such synchronization of the frequency and phase of the keying signals for the amplifiers 56 and 57, advantage is taken of the fact that the balanced frequency discriminators and detectors 59 and 60 always produce unidirectional voltages, pulsating at 60 cycles per second, in their output circuits when adjustment of the recording stylus 54 is required.

Figure 4:
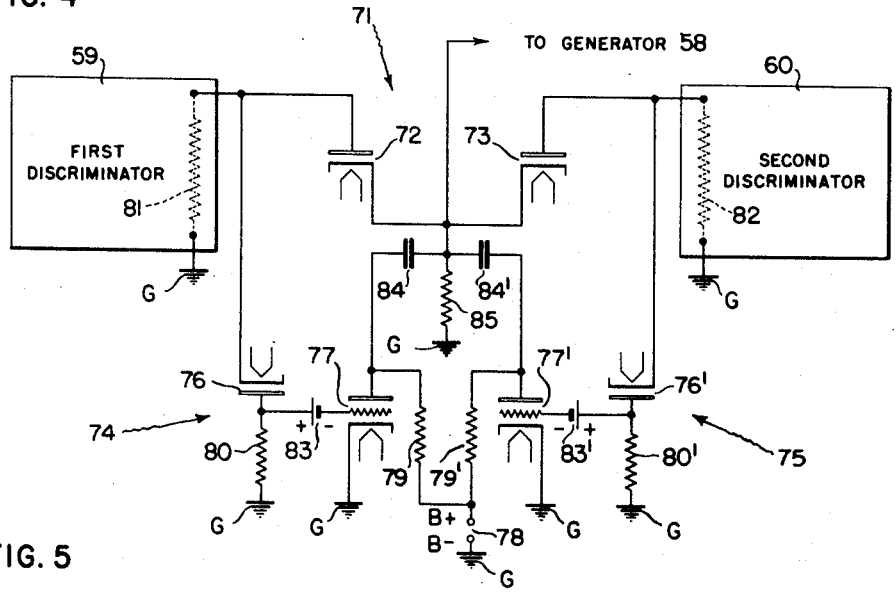
Fig. 4 illustrates in detail the phase controlling device of the arrangement of Fig. 3.

Specifically, the output circuits of each of the frequency discriminators and detectors 59 and 60 are coupled to the input circuit of the keying signal generator 58 by means of a phase controlling device indicated generally by the reference character 71 and shown in detail in Fig. 4. Device 71 is operative to impress on the input circuit of the keying signal generator 58 a 60 cycle per second keying voltage which is in synchronism with the keying signal voltage impressed on the oscillation generators 18 and 19 at the transmitter and which is always of the same phase regardless of the polarity of the pulsating signal voltages derived in the output circuits of the frequency discriminators and detectors 59 and 60.

Referring to Fig. 4 it will be noted that the phase controlling device 71 includes a pair of diode rectifiers 72 and 73 which may be included in the same envelope and also includes two phase inverter circuits indicated, respectively, by the reference numerals 74 and 75. The phase inverter circuits 74 and 75 may be identical in construction, and therefore, only the phase inverter circuit 74 will be described. Parts of the phase inverter circuit 75 corresponding to those of the phase inverter circuit 74 have been indicated by the same reference numerals with a prime figure added.

As shown, the phase inverter circuit 74 includes a diode 76 and a triode 77 both of which may be contained within the same envelope. Anode voltage is supplied the triode 77 from a suitable source of unidirectional voltage indicated at 78 through a circuit which may be traced from the positive terminal of the source 78 through a resistor 79 to the anode of triode 77 and from the cathode thereof to the negative terminal of the source 78. The input circuit of the triode 77 is controlled in accordance with the voltage developed across a resistor 80 connected in the output circuit of diode 76, which output circuit may be traced from the grounded output terminal of the frequency discriminator and detector 59 through resistor 80 to the anode of diode 76 and the cathode thereof to the other output terminal of the frequency discriminator and detector 59. In Fig. 4 the frequency discriminators and detectors 59 and 60 have been shown as including resistors 81 and 82, respectively, which shunt their output terminals. Suitable biasing means, shown in Fig. 4 as comprising a battery 83, is provided for applying the required biasing voltage on the input circuit of the triode 77.

The output circuit of the triode 77 is coupled by means of a condenser 84 to a resistor 85 which is connected in the controlling input circuit of the keying signal generator 58. The output circuit of the triode 77' similarly is coupled to the resistor 85 by means of a condenser 84'. Resistor 85 is also included in a circuit which is common to the output circuits of each of the diodes 72 and 73.

The output circuit of diode 72 may be traced from the grounded output terminal of the frequency discriminator and detector 59 through resistor 85 to the cathode of diode 72, the anode thereof and resistor 81, back to said grounded output terminal. Similarly, the output circuit of the diode 73 may be traced from the grounded output terminal of the frequency discriminator and detector 60 through resistor 85 to the cathode of the diode 73, the anode thereof and resistor 82, back to the grounded output terminal of the frequency discriminator and detector 60.

Accordingly, when a pulsing unidirectional voltage is produced at either or both of the output terminals of the frequency discriminators and detectors 59 and 60 of the polarity rendering the ungrounded output terminal positive with respect to the grounded output terminal, one or the other or both of the diodes 72 and 73 will be rendered conductive intermittently to produce a corresponding pulsing unidirectional voltage across the resistor 85. The polarity of this unidirectional voltage across the resistor 85 in each case will be such as to make the ungrounded terminal positive with respect to the grounded terminal.

When a pulsing unidirectional voltage of the opposite polarity is produced across either or both of the output terminals of the frequency discriminators and detectors 59 and 60, one or the other or both of the diodes 76 and 76' will be rendered conductive intermittently to cause the associated triode 77 or 77' to become non-conductive and to thereby produce a pulsing voltage across the resistor 85. By virtue of the action of the phase inverters 74 and 75, the polarity of the voltage produced across the resistor 85 in this case also will be such as to make the ungrounded terminal positive with respect to the grounded terminal. Therefore, regardless of the polarity of the output voltages produced across the output terminals of the frequency discriminators 59 and 60, the polarity of the pulsing voltage produced across the resistor 85 is always of the same polarity.

This voltage derived across the resistor 85 is utilized to control the operation of the keying signal generator 58 in a well known manner and effects synchronization of the 60 cycle keying voltage in the output circuit of the keying signal generator with the keying voltage at the transmitter. The keying signal generator, as shown in Fig. 3, is provided with two output circuits, one of which is applied to the input circuit of the amplifier 56 and the other of which is applied to the input circuit of the amplifier 57. These keying output voltages are 180° out of phase with each other so that the keying voltage applied to the amplifier 56 blocks that amplifier during one half cycle of the keying signal voltage and the keying voltage applied to the input circuit of the amplifier 57 blocks that amplifier during the alternate half cycles of the keying voltage.

For reproducing the transmitted information to the receiver there is provided mechanical apparatus, as shown, including the recording stylus 54 which is arranged to be moved horizontally and vertically by means of cable drives connected to the reversible motors 67 and 68, respectively. Specifically, the recording stylus 54 is arranged to be actuated for movement in the horizontal and vertical directions by means of bars 85 and 86, respectively. The bars 85 and 86 are provided with rollers on their ends, which have not been shown in order to avoid complication of the drawing, and which ride on individually associated tracks which also have not been shown but which may be provided in the base of the recording instrument. As the rods 85 and 86 are moved, the pen carriage 87 which supports the recording stylus 54 will be moved in any direction relatively to an associated chart 88. If rod 85 only is moved as upon operation of motor 67, the carriage 87 will be moved in a horizontal direction only. Similarly, if rod 86 only is moved as upon operation of motor 68, the carriage 87 will be moved in a vertical direction only. If the rods 85 and 86 are simultaneously moved, the pen carriage 87 will be moved at an angle to both sides of the receiving instrument.

Movement is imparted to the rod 85, as previously noted, by the motor 67 which has a drive pulley 89 attached to it. This pulley 89 drives a cable 90 which passes over suitable guide pulleys at opposite ends of the path of movement of the rod 85. In a like manner, motor 68 is utilized to impart movement to the rod 86 and to this end the motor 68 has a drive pulley 91 attached to its shaft. As the pulley 91 is rotated it drives a cable 92 that passes around suitable guide pulleys at the opposite ends of the vertical path of movement of the stylus 54. In consequence, as the motors 67 and 68 are energized for rotation in one direction or the other in response to the reception of signals from the transmitter, the recording stylus 54 will be adjusted relatively to the associated chart 88 to produce an exact reproduction of the movement imparted to the writing stylus 2 at the transmitter.

Figure 5:
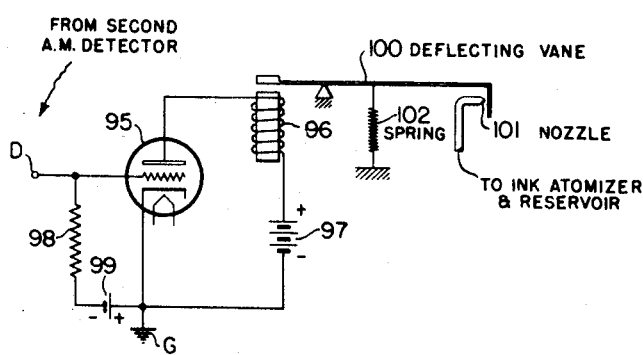
Fig. 5 shows one form of apparatus which may be utilized to control the operation of the recording stylus of the arrangement of Fig. 3.

The recording stylus 54 may, if desired, consist of an ink spray or vapor gun as used in the art of facsimile. By way of example, an ink spray or vapor gun of the type disclosed on pages 94-96, 174 and 175 of "Radio Facsimile," volume I, published in October 1938 by RCA Institutes Technical Press, New York, New York, may be utilized. Fig. 5 illustrates schematically such an ink spray or vapor gun arrangement. For actuating the ink spray or vapor gun during marking intervals there is provided a first amplitude-modulated detector indicated by the reference numeral 93 to the input circuit of which the output signals from the intermediate frequency amplifier are applied. During marking intervals a 200 cycle output signal is developed in the output circuit of the amplitude-modulated detector 93. A second amplitude-modulated detector indicated at 94 is provided for detecting the 200 cycle signal to produce a unidirectional voltage in the output circuit of the detector 94.

Referring now to Fig. 5 of the drawing, there is shown an electron discharge tube 95 adapted to have unidirectional output signals from the second amplitude-modulated detector 94 applied to its control grid and having a relay 96 connected in its anode circuit. A battery or other suitable source of voltage indicated at 97 is provided to supply anode voltage to the tube 95. A resistor 98 and a suitable source of voltage indicated at 99 are utilized to provide the proper biasing potential to the control grid of tube 95.

The relay 96 is arranged to actuate a deflecting vane 100 which normally covers a nozzle 101 connected to an atomizer and reservoir (not shown) all of which comprise part of the ink spray gun. During spacing intervals, the deflecting vane is held over the nozzle opening by means of a spring 102, as shown, so that no ink is deposited on the recording chart 88. During marking intervals the relay 96 is energized and operates to overcome the tension of spring 102 whereupon the vane 100 is actuated away from the nozzle 101 and permits the spray gun to deposit ink on the chart 88.

If desired, the mechanism for actuating the recording stylus 54 along the chart 88 in two coordinates may be of the type disclosed in the application of G. W. Barnes, Jr., R. M. Johnson, and W. P. Wills, Serial No. 620,828, filed concurrently herewith.

As those skilled in the art will understand, the values of frequencies which have been referred to for purposes of illustration are not limiting factors in the operation of the telautograph system of my present invention and that operation with other frequencies may also be realized, if desired. Moreover, while amplitude-modulation by a 200 cycle signal has been shown ahead of the modulation upon the 5 megacycle carrier in the transmitter as seen in Fig. 1, it will be understood that it is possible also to effect the 200 cycle modulation after the side-band suppression.

While, in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claim, and that in some cases certain features of the invention may sometimes be used to advantage without a corresponding use of other features.

Having now described my invention, what I claim as new and desire to secure by Letters Patent, is as follows:

Apparatus for transmitting intelligence including a transmission element movable through a course which defines the subject matter to be transmitted, a pair of oscillation circuits each having a tuning circuit controlled by movement of said transmitting element in an individually associated coordinate, said oscillation circuits being so arranged that the frequencies of the oscillating signals produced by both of said oscillation circuits vary over approximately the same range as said transmitting element is adjusted between its extreme positions, means operative to alternately render one and then the other of said oscillation circuits inoperative, a reproducing element, a first frequency responsive device to adjust said reproducing element along one coordinate, a second frequency responsive device to adjust said reproducing element along the other coordinate, transmission circuit means to apply both of the oscillating signals produced by said pair of oscillation circuits to said first and second frequency responsive devices, keyed means operative when actuated to render each of said frequency responsive devices inoperative, and keying means to alternately actuate each of said keyed means in synchronism with said first mentioned means comprising means to derive from each of said frequency responsive devices an associated undulating voltage of one phase or of opposite phase, a pair of phase control devices each of which is responsive to one of said undulating voltages to control said keying means, each of said phase control devices including a circuit having connected in series therein a common resistor and a diode upon which an associated one of said undulating voltages is applied, a second circuit including in series a diode and a resistor and upon which said associated undulating voltage is applied, said diode of each of said first mentioned circuits being so connected that it is conductive when the associated undulating voltage is of one phase and said diode of each of said second mentioned circuits being so connected that it is conductive when the associated undulating voltage is of the opposite phase, and an electron discharge device having an input circuit coupled to the associated second mentioned resistor and an output circuit coupled to said common resistor, and means coupled to said common resistor to control the operation of said keying means.

RUDOLF F. WILD.

REFERENCES CITED

The following references are of record in the file of this patent:

UNITED STATES PATENTS

| Number | Name | Date |
|---|---|---|
| 1,822,868 | Grimes | Sept. 8, 1931 |
| 2,095,050 | Beverage | Oct. 5, 1937 |
| 2,202,823 | Bennett | June 4, 1940 |
| 2,269,599 | Moodey | Jan. 13, 1942 |
| 2,376,395 | Skellett | May 22, 1945 |
| 2,380,982 | Mitchell | Aug. 7, 1945 |
| 2,409,559 | Haight | Oct. 15, 1946 |
| 2,415,718 | Wilson et al. | Feb. 11, 1947 |
| 2,446,392 | Rey | Apr. 3, 1948 |